US007551317B2

(12) United States Patent
Engler et al.

(10) Patent No.: US 7,551,317 B2
(45) Date of Patent: Jun. 23, 2009

(54) COLOR CONTROL FOR A PRINTING PRESS HAVING SPECTRALLY BASED COLORIMETRY

(75) Inventors: Hans Engler, Schriesheim (DE); Werner Huber, Rauenberg (DE); Manfred Schneider, Bad Rappenau (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 802 days.

(21) Appl. No.: 10/340,503

(22) Filed: Jan. 10, 2003

(65) Prior Publication Data

US 2003/0169440 A1 Sep. 11, 2003

(30) Foreign Application Priority Data

Jan. 15, 2002 (DE) ................................ 102 01 172

(51) Int. Cl.
*G06F 15/00* (2006.01)
*B41J 1/00* (2006.01)

(52) U.S. Cl. ........................ 358/1.9; 358/534; 358/517; 382/162; 382/167; 101/484; 349/9

(58) Field of Classification Search .................. 358/1.9, 358/534, 517; 382/162–167; 101/484; 349/9
See application file for complete search history.

(56) References Cited

U.S. PATENT DOCUMENTS

| | | | | |
|---|---|---|---|---|
| 4,649,502 | A * | 3/1987 | Keller et al. | 358/1.9 |
| 4,961,646 | A | 10/1990 | Schraemmli et al. | |
| 6,041,708 | A | 3/2000 | Kipphan et al. | 101/365 |
| 6,084,693 | A * | 7/2000 | Zimmermann et al. | 358/534 |
| 6,564,714 | B2 * | 5/2003 | Brydges et al. | 101/484 |
| 2003/0001991 | A1 * | 1/2003 | Faris et al. | 349/98 |

FOREIGN PATENT DOCUMENTS

| | | |
|---|---|---|
| DE | 19724171 | 10/1997 |
| DE | 4407332 | 8/1998 |
| DE | 19950176 | 5/2001 |
| EP | 0228347 | 7/1987 |
| EP | 0143744 | 1/1988 |
| EP | 1 154 247 | 11/2001 |
| JP | 1 227043 | 9/1989 |
| JP | 09 011446 | 1/1997 |

OTHER PUBLICATIONS

Gerhard Fischer et al. 'Eln physikalisches Modell fuer die Beschrelbung von Lichstreuprozessen' in Die Farbe, 1982, pp. 199-220 (see description in paragraph (0007) of specification).

* cited by examiner

*Primary Examiner*—David K Moore
*Assistant Examiner*—Quang N Vo
(74) *Attorney, Agent, or Firm*—Davidson, Davidson & Kappel, LLC

(57) ABSTRACT

A method and a measuring device are proposed for controlling the color application of a printing press (10) using at least one ink-feeding device (20) on the basis of spectral reflectance values of printed surface elements (24) on a print substrate (22), which are distinguished in that measured spectral reflectance values are converted into corrected spectral reflectance values. The method and/or the measuring device can be advantageously used in a printing system having a printing press (10), to implement a control on the basis of polarized spectral reflectance values, in particular for a detector (28) which measures unpolarized spectral reflectance values.

12 Claims, 2 Drawing Sheets

COLOR CONTROL FOR A PRINTING PRESS HAVING SPECTRALLY BASED COLORIMETRY

Priority to German Patent Application No. 102 01 172.9, filed Jan. 15, 2002 and hereby incorporated by reference herein, is claimed.

BACKGROUND INFORMATION

The present invention is directed to a method for controlling color for a printing press using at least one ink-feeding device. In addition, the present invention is directed to a measuring device having a detector for measuring spectral reflectance values on at least one printed surface element on a print substrate, an associated control unit including a processor unit and a memory unit; the present invention also relates to a printing system having at least one printing press, which includes at least one print unit, an ink-feeding device, and a machine-control unit.

Controlling the ink application in a printing press is an important way to influence the printing result. To analyze the printing result, from which operational principles for controlling the ink application are derived, color-control fields, whose chromatic values are determined by visual assessment or by taking measurements on the surface elements, are often printed in the same print job on surfaces elements of the print substrate (paper, cardboard, organic polymeric foil or the like). One way to accomplish this is to determine the spectral reflectance $\beta(\lambda)$ of the surface elements. In the notation employed here, $\beta(\lambda)$ signifies that the reflectance $\beta$ is a function of the wavelength $\lambda$. From the spectral reflectance, colormetric values or density values can be calculated. For this, standard specifications have been issued in Germany. Colormetric values can be defined on the basis of the German Industrial Standard DIN 16 536, and density values on the basis of the German Industrial Standard DIN 5033.

From European Patent No. 0 228 347 B2, a method for controlling the ink application of a printing press, as well as a measuring device and a printing system are known. To control the ink application, surface elements are measured colormetrically on a print substrate printed on by a printing press, and the color coordinates obtained are processed, in combination with setpoint values, into control data for ink-feeding devices of the printing press. The light reflected off of the surface elements is spectrally dispersed and measured in a spectrometer. The measuring data obtained at discrete points of reference of different wavelengths are fed to a computer. The control is carried out on the basis of spectral color measurement and colorimetry, in that, optionally in a conversion operation, chromatic values in a color-coordinate system are determined from the reflectance values. Actual values are compared to setpoint values, and deviations in the spectral reflectance or in the chromatic values are reduced by the color control.

Spectral reflectance can be measured either in an unpolarized or polarized operation. In other words, polarized, in particular linearly polarized light can be optionally used for illumination purposes, and a detector can be equipped with polarization optics or with a polarizer to measure polarized, reflected light. Typically, the light is measured using linear polarization rotated by 90 degrees; this is a component of the depolarized, reflected light. However, because of technical limitations, it is not always possible to equip detectors with polarization optics. Furthermore, polarization optics or polarization spectrometers constitute a considerable cost factor. Polarized spectral reflectance is an example of a variable whose measurement entails substantial outlay.

However, knowledge of the polarized spectral reflectance is vital, since it is independent of the drying state of the print substrate. The spectral reflectance must often be measured during or immediately after the printing operation, which means, particularly in present-day offset printing, that the print substrate has a specific moisture content. The moisture content decreases too slowly for it to be useful for analysis of the printing result. A color control on the basis of polarized spectral reflectance values or on the basis of chromatic values determined on the basis of polarized spectral reflectance values, implies setpoint values which are independent of the drying state of the print substrate and, thus, time-invariant following the printing operation. Thus, if the setting of a printing press to desired setpoint values is tracked for a print production, then during or immediately following the printing operation, actual values of polarized spectral reflectance or chromatic values derived therefrom can be compared to the setpoint values and ink-feeding devices can be controlled until the ink supply in the printing press is such that the deviation between actual values and setpoint values is imperceptible to the point of being sufficiently precise. It is often the color difference $\Delta E$ in the underlying color space that is regarded as a measure of sufficient precision. When $\Delta E<1\pm0.5$, the color difference is below the threshold of perception or visibility. Even for a length of time following the printing operation, this result does not fundamentally change, since the color control is based on time-invariant variables.

Creating a physical model to describe light-scattering processes in print substrates is extremely difficult, due to the optical properties of customary print substrates. This can be inferred, for example, from the article by G. Fischer, J. Rodriguez-Giles and K. R. Scheuter in "Die Farbe" [Color] 30 (1982), pp. 199 through 220. To mention just a few examples of how light is affected, on the one hand, the light that is incident to the print substrate is not only scattered directly at the surface, but can also be scattered, in part, inside the surface layer of the print substrate, and, on the other hand, the light is not only scattered on the way into the print substrate, but can also be scattered on its way out of it again. Thus, the light paths through the surface layer of a print substrate are very complicated, and the reflectance behavior resulting therefrom can only be calculated in simple cases and not globally. For that reason, there seem to be insurmountable limits placed on a calculation of the polarized spectral reflectance, in particular on a universal type of calculation for various print substrates.

SUMMARY OF THE INVENTION

An object of the present invention is to devise a color control for a printing press which is based on spectral reflectance values, without the need for measuring the same and thereby avoiding substantial outlay.

In accordance with the present invention, the method for controlling color in a printing press using at least one ink-feeding device includes the following steps. Spectral reflectance values $\beta(\lambda)$ are determined by taking measurements on at least one printed surface element on a print substrate. The measured spectral reflectance values $\beta(\lambda)$ are converted or transformed into corrected spectral reflectance values $\beta'(\lambda)$. On the basis of the corrected spectral reflectance values $\beta'(\lambda)$, actual values are determined for the ink-feeding variables. The actual values obtained are processed, in combination with setpoint values for the ink-feeding variables, into control data for the ink-feeding device.

The ink-feeding variables may be colormetric values or density values, so that their actual values are determined from spectral reflectance values. Alternatively, the ink-feeding variables may be spectral reflectance values, so that their setpoint values are determined from colormetric values or density values.

The conversion or transformation may be preferably based on a spectrally dependent relation. In other words, corrected spectral reflectance values $\beta'(\lambda)$ are in a functional relation with spectral reflectance values $\beta(\lambda)$ and with other terms which are dependent upon wavelength $\lambda$. In a closed-form notation, this factual situation may be expressed as $\beta'(\lambda)=f(\beta(\lambda),\lambda)$. In this context, the functional relation may be known in the form of a table of a number of points of reference of different wavelengths or in the form of a functional equation. The functional relation is based on a physically motivated light-scattering and absorption model having empirical modifications. Preferably, the colormetric values are determined in accordance with the German Industrial Standard DIN 16 536, and the density values in accordance with the German Industrial Standard DIN 5033.

In one advantageous specific embodiment of the method according to the present invention, the measured spectral reflectance values $\beta(\lambda)$ are obtained by taking unpolarized measurements. Corrected spectral reflectance values $\beta'(\lambda)$ obtained by conversion or transformation may be used to allow for special features of the detector, the ink-feeding device or the like. In other words, the conversion advantageously permits a calibration of the detector.

In one advantageous specific embodiment of the method according to the present invention, calculated spectral reflectance values $\beta'(\lambda)$ may, furthermore, correspond with a certain precision to measured spectral reflectance values obtained through polarized measurement. A certain precision is understood here to mean a precision of a measure of the difference. An advantageous measure of the difference is the color difference $\Delta E$ in the corresponding color space. Preferred is a difference $\Delta E<1\pm0.5$ below the threshold of perception or visibility. In other words, the advantageous specific embodiment of the method according to the present invention enables polarized colormetric values or polarized density values to be determined, in that measured, unpolarized spectral reflectance values $\beta(\lambda)$ are converted into polarized spectral reflectance values $\beta'(\lambda)$, which then form the basis for determining the colormetric values or density values. The method according to the present invention may advantageously be employed in the measurement of still damp print substrates, since the actual value—setpoint value comparison is based on time-invariant variables.

Particularly advantageous is a specific embodiment where a conversion is based on the relation or the computation procedure $$\beta'(\lambda)=\exp\{1n[\beta(\lambda)/P_{unpol}(\lambda)-\beta_0]s\}P_{pol}(\lambda)\{1-q[P_{unpol}(\lambda_{max})-\beta(\lambda_{max})]\}V(\lambda)^{Dr} \quad (1)$$

The variables inserted in this notation denote the following: $P_{unpol}(\lambda)$ the unpolarized reflectance value of the unprinted print substrate at wavelength $\lambda$; $P_{pol}(\lambda)$ the polarized reflectance value of the unprinted print substrate at wavelength $\lambda$; $\beta_0$ a term, which considers the component of the reflected light directly at the surface of the print substrate; $\lambda_{max}$ is a specific wavelength at which a clear effect of an optical brightener is achieved; $\lambda_{max}$ is preferably that wavelength at which a maximal reflectance takes place. s indicates the virtual thickness of the ink layer on the print substrate, q and r are weighting factors, and $V(\lambda)$ describes the polarizing action, also of the transmittance of a wavelength-dependent filter. Furthermore, the color density of the measured chromatic tone is $D=-\log[\beta/\beta_{pap}]$ where $\beta=\int d\lambda\beta(\lambda)F(\lambda)$, thus the integral spectral reflectance over all wavelengths, and $\beta_{pap}=\int d\lambda\beta_{pap}(\lambda)S(\lambda)F(\lambda)$ for the spectral reflectance values $\beta_{pap}(\lambda)$ of the print substrate (either $P_{unpol}(\lambda)$ or $P_{pol}(\lambda)$, preferably $P_{unpol}(\lambda)$), thus the integral spectral reflectance of the print substrate over all wavelengths. $F(\lambda)$ stands for a wavelength-dependent filter function (transmittance of the filter), and $S(\lambda)$ stands for a wavelength-dependent radiation function (relative spectral distribution of radiation) in accordance with German Industrial Standards DIN 5033 and DIN 16 536. The relative sensitivity of the detector may also be additionally considered in the integrand as the result of multiplication by a wavelength-dependent function. Instead of the paper spectrum, a different reference standard may also be used. With regard to the physical motivation of this relation, the exponential term describes the extinction in the print substrate, and term $\{1-q[P_{unpol}(\lambda_{max})-\beta(\lambda_{max})]\}$ considers the effect of optical brighteners in the print substrate.

While $\beta(\lambda)$ and $P_{unpol}(\lambda)$ are measured, filter function $V(\lambda)$ and the other variables are defined. In one preferred specific embodiment, $V(\lambda)$ is typically a continuous function over the wavelength interval [380 nm, 730 nm]. Its range of values lies in interval [0.3,2], preferably in interval [0.8,1.2]. The function has a small number of maxima and minima distributed over the wavelength interval.

Typical values for the other variables in equation (1) are: $\beta_0\in[0,0.1]$, $s\in[0.8,2]$, $q\in[-0.5,0.5]$, $r\in[0.3]$ and $\lambda_{max}\in[300\text{ nm}, 580\text{ nm}]$. The described computation procedure is applicable to a very broad range of various chromatic tones and/or print substrates. Variable sets from these ranges may be used for at least one class of print substrates. In one specific embodiment, the classes uncoated paper, dull-coated paper, and plain paper are created for the paper print substrate. The paper types are classified in these classes following general printing technology usage. For wavelength $\lambda_{max}$, 390 nm is preferred, in particular.

For chromatic tones having a total (integral) reflectance over 2.2% of the incident illumination, preferred, in particular, for plain paper are $\beta_0=0.0015$, s=1.009, q=−0.146 and r=0.55, for dull-coated paper $\beta_0=0.0053$, s=1.059, q=0.08 and r=0.92, and for uncoated paper $\beta_0=0.023$, s=1.09, q=−0.32 and r=1.0. For chromatic tones having a very low total reflectance (below 2.2% of the incident illumination), preferred, in particular, for plain paper are $\beta_0=0.005$, s=1.05, q=0 and r=0.3, for dull-coated paper $\beta_0=0.005$, s=1.097, q=0 and r=0.5, and for uncoated paper $\beta_0=0.005$, s=1.27, q=0 and r=2.

$P_{pol}(\lambda)$ may either be measured or calculated. One preferred computation procedure for determining $P_{pol}(\lambda)$ reads:

$$P_{pol}(\lambda)=\frac{P_{unpol}(\lambda)}{W(\lambda)}r_p-P_0.$$

In this connection, typical values for the variables are: $W(\lambda)\in[0.8,3]$, $r_p\in[0.8,1.2]$ and $P_0\in[0,0.05]$. Preferred are $r_p=1.02$ and $P_0=1.01$. In various specific embodiments, for different print substrate classes, such as uncoated paper, plain paper, and dull-coated paper, different variable values may be provided.

The order of the terms is typically as follows: The largest percentage, about 70%, is derived from the extinction, a middle percentage, about 20%, is derived from the consideration of the optical brightener, and the smallest percentage, about 10%, of the filter term renders possible a result of a certain precision level below the threshold of visibility, thus for measure $\Delta E$ in the underlying color space, $\Delta E<1\pm0.5$.

The conversion is based, therefore, on a physical model which appropriately links the absorption and reflection of the light at the surface being considered and the properties of the surface itself. A universally valid range of values for the variables is determined which considers the weighting of the influence of absorption and reflection of the light at the surface being considered, the influence of the print substrate, and the typical characteristics of the polarization filters. The method according to the present invention is able to be universally applied because the conversion or transformation is made dependent upon various properties of the spectral reflectance values in each instance. Accordingly, for a given chromatic tone, the spectral reflectance measured in an unpolarized operation is multiplied by a reflectance intensity-dependent factor and shifted by a specific amount by addition of a further term. The influence of optical brighteners in the print substrate is considered as a function of density. A normalization to the reflectance properties of the print substrate is carried out. To determine the typical characteristics of a physical polarization filter, a wavelength-dependent correction is made.

For one skilled in the art for whom this technical teaching is of value, it is clear that the relation according to equation (1) may also be given in equivalent fashion by transposing the terms and/or by expanding the higher functions in the series representation up to terms of an order having a certain precision, without obtaining a new relation that fundamentally differs from the specified computation procedure.

The concept of the present invention also includes the creation of a measuring device and a printing system in each of which the method according to the present invention is realized. In accordance with the present invention, a measuring device includes a detector for measuring spectral reflectance values on at least one printed surface element on the print substrate, and an associated control unit which includes a processor unit and a memory unit. It is distinguished by a computer program which runs in the processor unit and is used to compute corrected spectral reflectance values $\beta'(\lambda)$ from measured spectral reflectance values $\beta(\lambda)$. The computer program is at least partially stored for a time period in the memory unit; preferably, it is completely stored in the memory unit for at least the duration of its execution.

The computer program preferably has at least one section in which a spectrally dependent assignment instruction is carried out between spectral reflectance values $\beta(\lambda)$ and corrected spectral reflectance values $\beta'(\lambda)$. The assignment instruction may be stored in the form of a table (look-up table) or in the form of a functional relation (for example, a subroutine or a function). Typical points of reference $\lambda_i$, index i counting off the points of reference, are wavelengths $\lambda$ having differences of less than or equal to 20 nm, in particular 10 nm.

In one advantageous specific embodiment of the measuring device, the detector includes an unpolarized spectrometer, and the calculated, corrected spectral reflectance values $\beta'(\lambda)$ correspond with a certain precision to measured spectral reflectance values (measure of the difference is preferably color difference $\Delta E$).

A preferred assignment instruction or conversion rule is in accordance with equation (1) indicated above, values for the variables being advantageous, in turn, from the intervals indicated above.

In one advantageous embodiment of the measuring device according to the present invention, in whose processor, spectral reflectance values are converted into colormetric values or density values, a computer program runs in the processor. It is at least partially stored for a time period in the memory unit and has at least one section in which colormetric values or density values are processed, in combination with setpoint values, into control data for the ink-feeding device.

In one alternative, advantageous embodiment of the measuring device according to the present invention, in whose processor, colormetric values or density values are converted into spectral reflectance values to generate setpoint values, a computer program runs in the processor. It is at least partially stored for a time period in the memory unit and has at least one section in which spectral reflectance values are processed, in combination with setpoint values, into control data for the ink-feeding device.

A printing system according to the present invention having at least one printing press, which includes at least one print unit, an ink-feeding device, and a machine-control unit, is distinguished in that the printing system has at least one measuring device according to the present invention. In this context, the printing press may function while executing any known printing process. The printing press, whether it be a sheet-fed or web press, is preferably a direct or indirect planographic press, in particular an offset press. It is especially beneficial when the control unit of the measuring device constitutes a part of the machine-control unit. This enables, for example, the measurement and control to be simply integrated in the production phase, even during the printing process, to facilitate, inter alia, short adjustment times for the control.

The need for a polarized detector, in particular a polarization spectrometer, is advantageously eliminated in the measuring device according to the present invention and, respectively, in the printing system according to the present invention. It is particularly advantageous in offset printing to achieve an independence from the drying state of the print substrate. It is possible at the same time, however, to implement the color control on the basis of spectral reflectance values whose measurement requires substantial outlay. In other words, the method according to the present invention and the measuring device according to the present invention, including such a device integrated in a printing system, enable polarized colormetric values or density values to be used, without the need for polarized spectral measurements. The inventive idea is universally applicable to various chromatic tones and/or to various printing materials. It is independent of the color set used in printing.

BRIEF DESCRIPTION OF THE DRAWINGS

Further advantages and advantageous specific embodiments and refinements of the present invention are described on the basis of the following figures, as well as their descriptions, in which.

DETAILED DESCRIPTION

Figure 1:
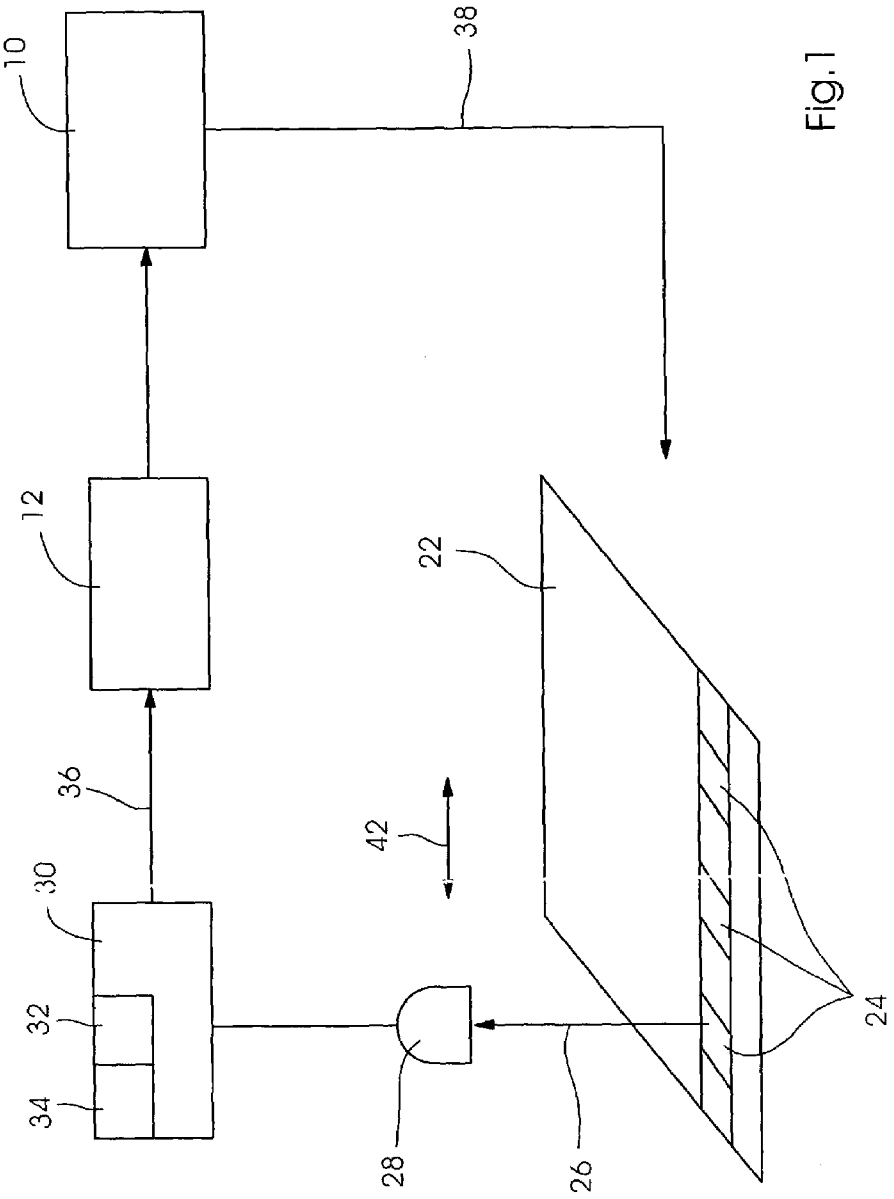
FIG. 1 shows a representation of the topology of a specific embodiment of a measuring device according to the present invention, with respect to a printing press.

FIG. 1 depicts a representation of the topology of a specific embodiment of a measuring device according to the present invention, with respect to a printing press. A printing press 10 has an assigned machine control 12. To control the color application, a measurement is taken in production flow 38, at a print substrate 22. Print substrate 22 has a number of printed surface elements 24, here, for example, three square surface elements. Full tones and/or halftones of one or more printing colors are typically used for printing on surface elements 24. It may also be a question of combination colors (superimposed printing) of a plurality of basic colors. Surface elements 22 are illuminated by a light source, which is not shown here in detail, preferably under standard conditions in accordance with German Industrial Standards DIN 16 536 and DIN 5033, and light 26, which is scattered, i.e., reflected by surface elements 22, is measured by a detector 28. Detector 28 is movable relatively to print substrate 22. Preferably provided is an actuator system for an absolute movement of detector 28 over the surface of print substrate 22, which is situated at a measuring location. Detector 28 is designed to be able to measure the unpolarized spectral reflectance values $\beta(\lambda)$. For example, the detector includes an unpolarized spectrometer. Detector 28 is connected to a control unit 30 which includes a processor 32 and a memory unit 34. In processor 32, a program may run which has at least one section which converts, in accordance with the present invention, measured spectral reflectance values $\beta(\lambda)$ into corrected spectral reflectance values $\beta'(\lambda)$, from which actual values are determined for the ink-feeding variables. 36 denotes a transfer of the ascertained values, whether they be the corrected spectral reflectance values $\beta'(\lambda)$ or colormetric values or density values derived therefrom, to machine control 12. Machine control 12 also includes a color application control for printing press 10. The color application control includes an actual value/setpoint value comparison of ink-feeding variables, and the ink-feeding control elements of the one or a plurality of ink-feeding devices may be modified as a function of the deviation of actual values from setpoint values.

Figure 2:
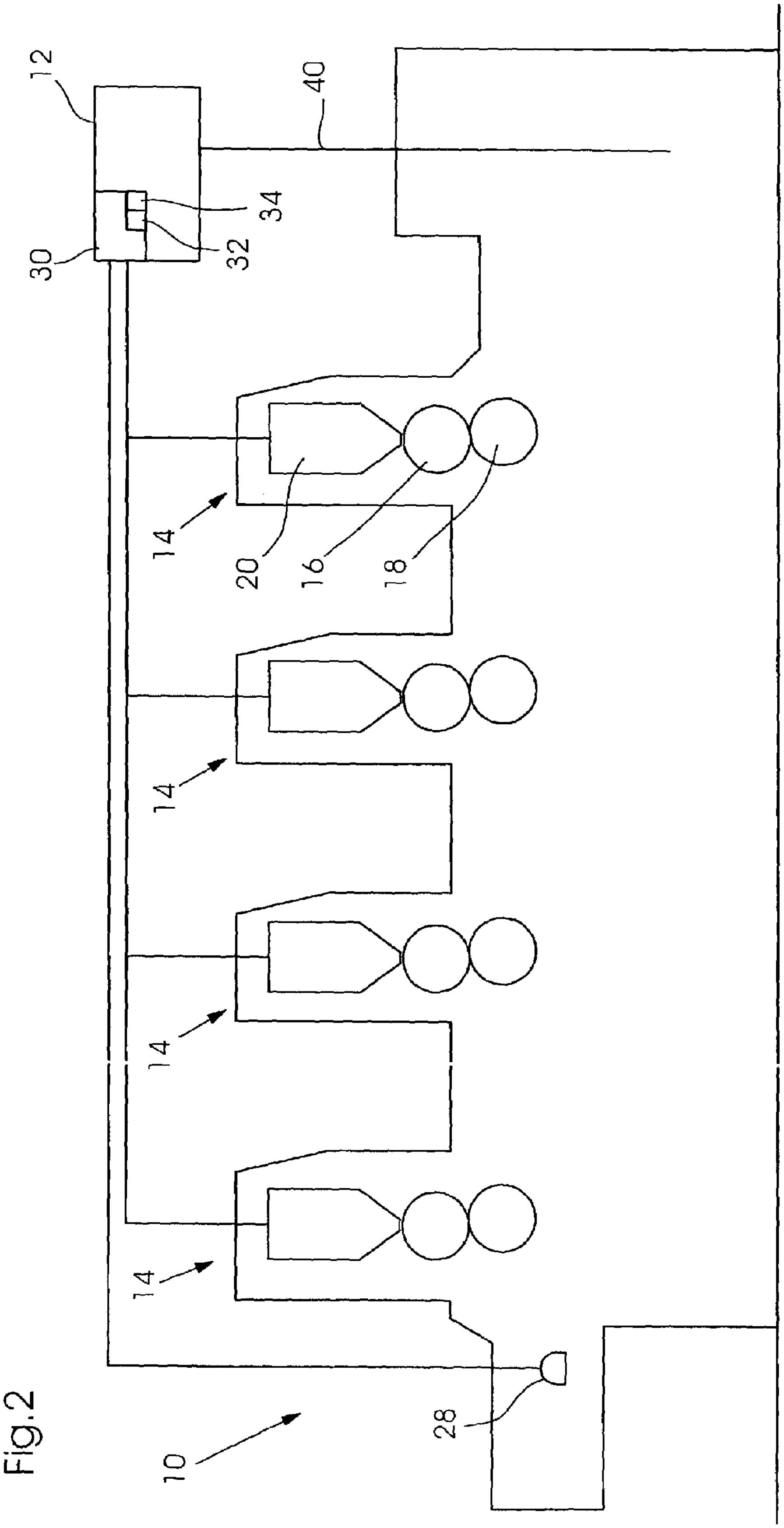
FIG. 2 shows a specific embodiment of a printing press according to the present invention.

FIG. 2 is a specific embodiment of a printing system in accordance with the present invention. The printing system has a printing press 10 and an assigned machine control 12. In this exemplary specific embodiment, printing press 10, which is a sheet-processing offset printing press, includes four print units 14, each having a form cylinder 16 and a transfer cylinder 18. Disposed in each of the four print units is an ink-feeding device 20, for example an offset inking unit having a number of ink zones. For the sake of simplification, further details pertaining to devices in printing press 10 are not shown, but they are familiar to one skilled in the art. A detector 28 for measuring unpolarized spectral reflectance values $\beta(\lambda)$ of surface elements on a print substrate printed on by printing press 10, is shown positioned here along the path of the print substrate web through printing press 10, downstream from the fourth and last print unit 14. For the case of an offset inking unit having a number of ink zones, surface elements may be printed on, on the print substrate for one or more ink zones. It is beneficial for detector 28 to be positioned downstream from the print units, to enable measured values to be obtained for all the colors used and, in some instances, combinations thereof. In this specific embodiment, detector 28 and ink-feeding devices 20 are operatively connected with a control unit 30 which is integrated in machine control 12. In other words, control unit 30, together with processor 32 and memory unit 34, constitutes a part of machine control 12. In processor 32 of the printing system according to the present invention, measured spectral reflectance values $\beta(\lambda)$ are converted into corrected spectral reflectance values $\beta'(\lambda)$.

REFERENCE SYMBOL LIST

10 printing press
12 machine-control unit
14 print units
16 form cylinder
18 transfer cylinder
20 ink-feeding device
22 print substrate
24 surface element
26 reflected light
28 detector
30 control unit
32 processor unit
34 memory unit
36 transfer to machine control
38 production flow
40 connection to the drive of the printing press
42 relative movement

What is claimed is:

1. A method for controlling color in a printing press using at least one ink-feeding device, comprising the steps of:

determining spectral reflectance values by taking measurements on at least one printed surface element on a print substrate;

converting the spectral reflectance values into corrected spectral reflectance values;

determining actual values for ink-feeding variables as a function of the corrected spectral reflectance values; and providing control data for the ink-feeding device as a function of the actual values obtained for the ink-feeding variables and setpoint values for the ink-feeding variables;

wherein the corrected spectral reflectance value is determined based on the relation $\beta'(\lambda)=\exp\{1n[\beta(\lambda)/P_{unpol}(\lambda)-\beta_0]s\}P_{pol}(\lambda)\{1-q[P_{unpol}(\lambda_{max})-\beta(\lambda_{max})]\}V(\lambda)^{Dr}$, $D=-\log[\beta/\beta_{pap}]$ with $\beta=\int d\lambda\beta(\lambda)F(\lambda)$ and $\beta_{pap}=\int d\lambda\beta_{pap}(\lambda)S(\lambda)F(\lambda)$ being for the spectral reflectance values $\beta_{pap}(\lambda)$ of the print substrate.

2. The method as recited in claim 1 wherein the ink-feeding variables are colormetric values or density values.

3. The method as recited in claim 1 wherein the setpoint values are determined from colormetric values or density values.

4. The method as recited in claim 1 wherein $\beta_0\epsilon[0,0.1]$, $s\epsilon[0.8,2]$, $q\epsilon[-0.5,0.5]$, $r\epsilon[0.3]$ and $\lambda_{max}\epsilon[300\text{ nm}, 580\text{ nm}]$.

5. A measuring device comprising:

a detector for measuring spectral reflectance values on at least one printed surface element on a print substrate; and a control unit including a processor unit and a memory unit, the control unit including program executable steps at least partially stored for a time period in the memory unit and executable by the processor unit, the program executable steps including computing corrected spectral reflectance values as a function of the spectral reflectance values, the program executable steps including a spectrally dependent assignment instruction carried out between the spectral reflectance values and the corrected spectral reflectance values;

wherein the assignment instruction for a number of points of reference $\lambda_i$, index i counting off the points of reference, reads:

$$\beta'(\lambda)=\exp\{1n[\beta(\lambda)/P_{unpol}(\lambda)-\beta_0]s\}P_{pol}(\lambda)\{1-q[P_{unpol}(\lambda_{max})-\beta(\lambda_{max})]\}V(\lambda)^{Dr},$$

$D=-\log[\beta/\beta_{pap}]$ with $\beta=\int d\lambda\beta(\lambda)F(\lambda)$ and $\beta_{pap}=\int d\lambda\beta_{pap}(\lambda)S(\lambda)F(\lambda)$ being for the spectral reflectance values $\beta_{pap}(\lambda)$ of the print substrate.

6. The measuring device as recited in claim 5 wherein the assignment instruction is stored in the form of a table or in the form of a functional relationship.

7. The measuring device as recited in claim 5 wherein the detector includes an unpolarized spectrometer, and the corrected spectral reflectance values correspond with a certain precision to the measured spectral reflectance values.

8. The measuring device as recited in claim 5 wherein $\beta_0 \epsilon [0,0.1]$, $s \epsilon [0.8.2]$, $q \epsilon [-0.5,0.5]$, $r \epsilon [0.3]$ and $\lambda_{max} \epsilon [300 \text{ nm}, 580 \text{ nm}]$.

9. The measuring device as recited in claim 5 wherein in the processor unit, the spectral reflectance values are converted into colormetric values or density values to generate actual values, the program executable steps including processing the colormetric values or density values in combination with setpoint values into control data for the ink-feeding device.

10. The measuring device as recited in claim 5 wherein in the processor unit, colormetric values or density values are used to generate setpoint values, the program executable steps including processing the spectral reflectance values in combination with setpoint values into control data for the ink-feeding device.

11. A printing system comprising:

at least one printing press including at least one print unit, an ink-feeding device, and a machine-control unit, and a detector for measuring spectral reflectance values on at least one printed surface element on a print substrate; and a control unit including a processor unit and a memory unit, the control unit including program executable steps at least partially stored for a time period in the memory unit and executable by the processor unit, the program executable steps including computing corrected spectral reflectance values as a function of the spectral reflectance values, the program executable steps including a spectrally dependent assignment instruction carried out between the spectral reflectance values and the corrected spectral reflectance values;

wherein the assignment instruction for a number of points of reference $\lambda_i$, index i counting off the points of reference, reads:

$$\beta'(\lambda)=\exp\{1n[\beta(\lambda)/P_{unpol}(\lambda)-\beta_0]s\}P_{pol}(\lambda)\{1-q[P_{unpol}(\lambda_{max})-\beta(\lambda_{max})]\}V(\lambda)^{Dr},$$

$D=-\log[\beta/\beta_{pap}]$ with $\beta=\int d\lambda\beta(\lambda)F(\lambda)$ and $\beta_{pap}=\int d\lambda\beta_{pap}(\lambda)S(\lambda)F(\lambda)$ being for the spectral reflectance values $\beta_{pap}(\lambda)$ of the print substrate.

12. The printing system as recited in claim 11 wherein the control unit of the measuring device is a part of the machine-control unit.

* * * * *